US012220855B2

United States Patent
Gläßer et al.

(10) Patent No.: US 12,220,855 B2
(45) Date of Patent: Feb. 11, 2025

(54) METHOD FOR PRODUCING A MOLDABLE, THERMOPLASTIC, CONTINUOUS FIBER REINFORCED COMPOSITE STRUCTURE, MOLDABLE COMPOSITE STRUCTURE, AND DEVICE FOR PRODUCING SAME

(71) Applicant: Fraunhofer-Gesellschaft zur Förderung der angewandten Forschung e.V., Munich (DE)

(72) Inventors: Thomas Gläßer, Halle (DE); Peter Stache, Halle (DE)

(73) Assignee: FRAUNHOFER-GESELLSCHAFT ZUR FÖRDERUNG DER ANGEWANDTEN FORSCHUNG E.V., Munich (DE)

(*) Notice: Subject to any disclaimer, the term of this patent is extended or adjusted under 35 U.S.C. 154(b) by 13 days.

(21) Appl. No.: 17/781,294

(22) PCT Filed: Nov. 26, 2020

(86) PCT No.: PCT/EP2020/083514
§ 371 (c)(1),
(2) Date: May 31, 2022

(87) PCT Pub. No.: WO2021/110536
PCT Pub. Date: Jun. 10, 2021

(65) Prior Publication Data
US 2023/0001626 A1    Jan. 5, 2023

(30) Foreign Application Priority Data
Dec. 3, 2019    (DE) .................... 10 2019 218 775.7

(51) Int. Cl.
B29C 51/14    (2006.01)
B29C 35/08    (2006.01)
(Continued)

(52) U.S. Cl.
CPC ........ *B29C 51/145* (2013.01); *B29C 35/0805* (2013.01); *B29C 35/0894* (2013.01);
(Continued)

(58) Field of Classification Search
CPC .............. B29C 51/145; B29C 35/0805; B29C 35/0894; B29C 51/421; B29C 2035/0822;
(Continued)

(56) References Cited

U.S. PATENT DOCUMENTS 3,922,899 A * 12/1975 Fremont ................ B21D 47/00
                                              428/116
6,251,202 B1 * 6/2001 Murphy ................ B29C 66/41
                                              156/275.3
(Continued)

FOREIGN PATENT DOCUMENTS

DE            94886        1/1973
DE      102010005456       7/2011
(Continued)

OTHER PUBLICATIONS

International Report on Patentability and Search Report for PCT/EP2020083514 mailed Nov. 30, 2021; 36 pages.
(Continued)

*Primary Examiner* — Brian Handville
(74) *Attorney, Agent, or Firm* — Fitch, Even, Tabin & Flannery LLP

(57) ABSTRACT

The invention is characterized by a semifinished composite structure product with the at least two layers, of which the at least one layer, in which the continuous fibers are contained, is heated such that the matrix of thermoplastic material is heated within at least one first surface region to or above a melting temperature that can be assigned to the thermoplastic material, and the matrix of thermoplastic material is kept to a temperature below the melting tem-
(Continued)

perature within a second surface region directly adjoining the first surface region. The semifinished composite structure product is heated in this way so that the moldable thermoplastic, continuous fiber-reinforced composite structure in which the continuous fibers within the first surface region are movable relative to each other and those within the second surface region are spatially fixed relative to each other.

12 Claims, 1 Drawing Sheet

(51) Int. Cl.
  *B29C 51/42* (2006.01)
  *B29K 101/12* (2006.01)
  *B29K 105/08* (2006.01)
  *B29L 7/00* (2006.01)

(52) U.S. Cl.
  CPC .... *B29C 51/421* (2013.01); *B29C 2035/0822* (2013.01); *B29K 2101/12* (2013.01); *B29K 2105/08* (2013.01); *B29L 2007/002* (2013.01)

(58) Field of Classification Search
  CPC ............ B29C 49/0005; B29C 35/0266; B29C 70/086; B29C 70/16; B29C 70/68; B29K 2101/12; B29K 2105/08; B29L 2007/002; B29D 24/005; B32B 5/022; B32B 5/024; B32B 27/12; B32B 37/182; B32B 2250/02; B32B 2250/03; B32B 2250/40; B32B 2260/021; B32B 2260/046; B32B 2262/0269; B32B 2262/062; B32B 2262/101; B32B 2262/106; B32B 1/00; B32B 3/12; B32B 5/18; B32B 5/245; B32B 37/04; B32B 38/0036; B32B 2305/022; B32B 2305/024; B32B 2305/07; B32B 2307/738; B32B 38/1866; B32B 5/26; B32B 2305/076; B32B 2305/18; B32B 2310/0825
  See application file for complete search history.

(56) References Cited

U.S. PATENT DOCUMENTS

| | | | |
|---|---|---|---|
| 2012/0315429 A1* | 12/2012 | Stamp ....................... | B32B 3/12 428/72 |
| 2014/0110051 A1* | 4/2014 | Desagulier ............ | B32B 37/146 156/292 |
| 2018/0022024 A1* | 1/2018 | Saito ....................... | C08G 69/26 264/482 |

FOREIGN PATENT DOCUMENTS

| | | |
|---|---|---|
| DE | 102011052979 | 2/2013 |
| DE | 102012006609 | 10/2013 |
| DE | 102013013497 | 2/2015 |
| DE | 102014006681 | 11/2015 |
| DE | 102016203711 | 9/2017 |
| WO | 2015090574 | 6/2015 |
| WO | 2018060195 | 4/2018 |
| WO | 2019164413 | 8/2019 |

OTHER PUBLICATIONS

Cetin, M. Dr., et al., "Hochdynamisches und homogenes Aufheizen von Organoblechen" (Ultradynamic, homogeneous heating of organic sheets), 16th ATZ Conference, Hamburg 2018; www.lightweight-design.de; 8 pages.

Girdauskaite, L., Lokale Strukturfixierung im Preformherstellungsprozess für komplex gekrümmte Faserkunststoffverbundbauteile (Local structure fixing in the preform production process for fibrefiber plastic composite components with complex curvatures), Dresden 2011.

* cited by examiner

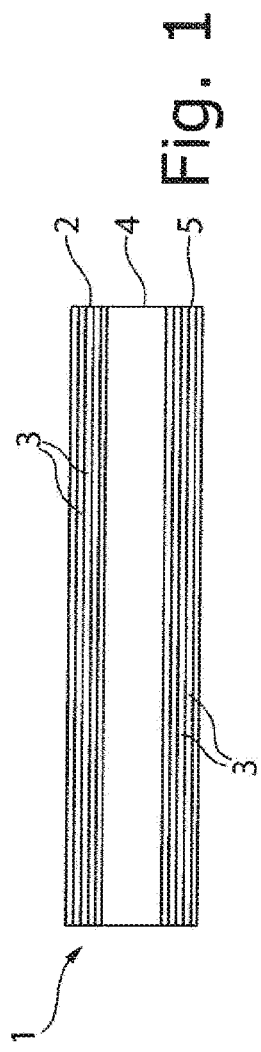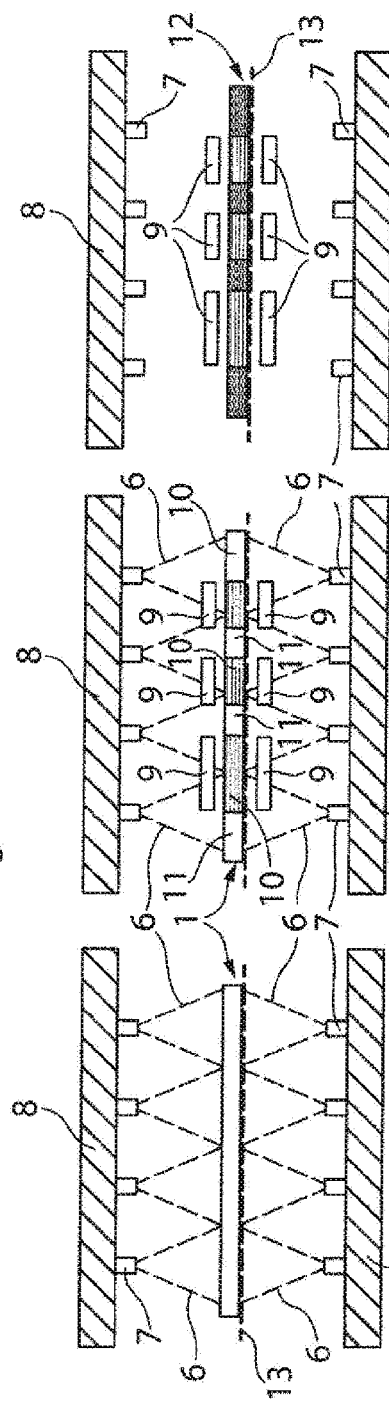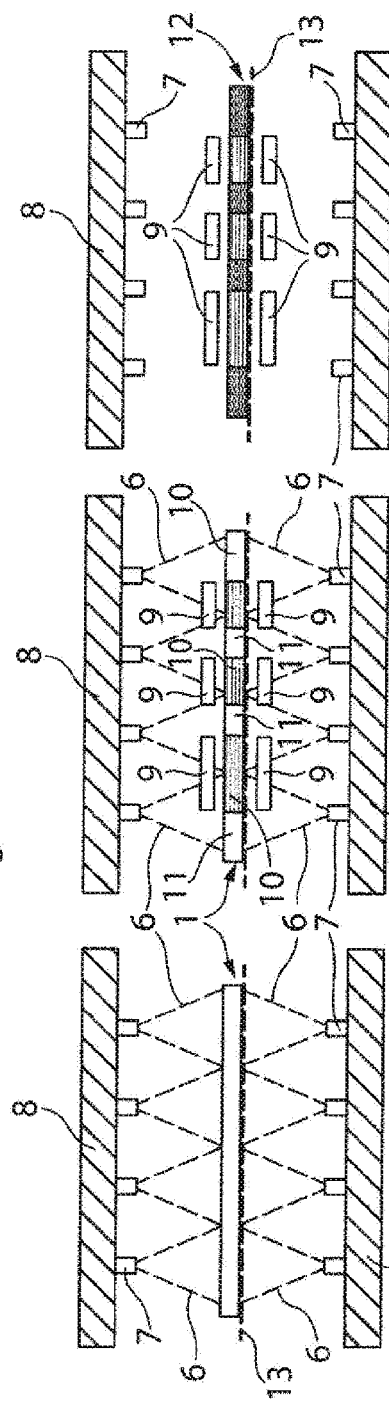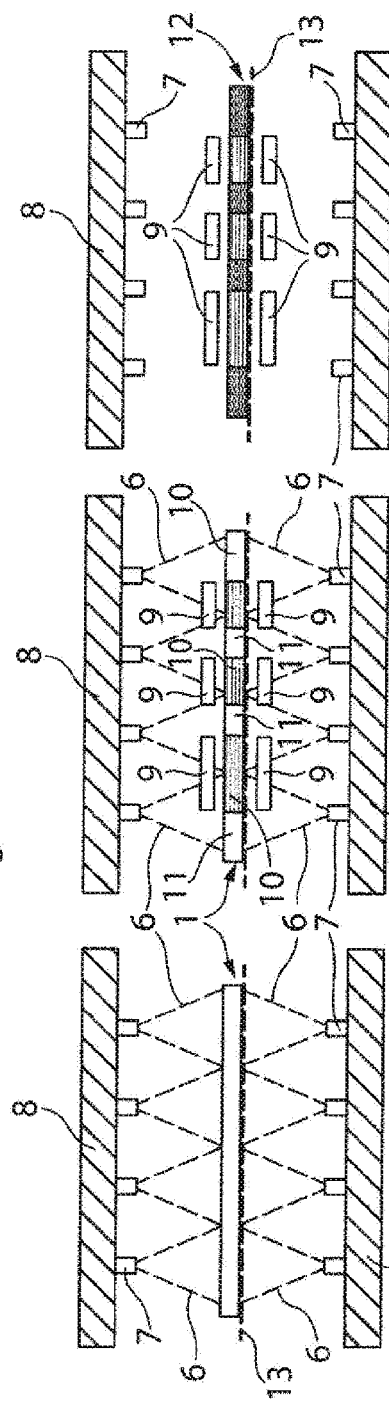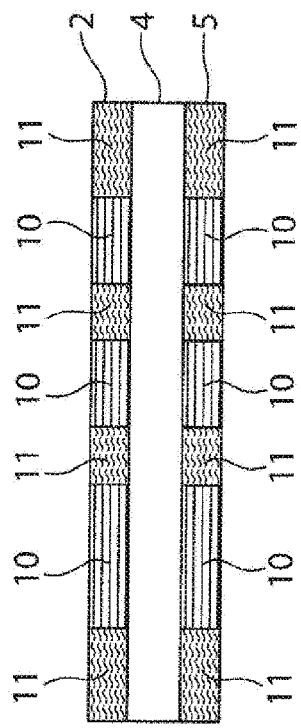

METHOD FOR PRODUCING A MOLDABLE, THERMOPLASTIC, CONTINUOUS FIBER REINFORCED COMPOSITE STRUCTURE, MOLDABLE COMPOSITE STRUCTURE, AND DEVICE FOR PRODUCING SAME

CROSS-REFERENCE TO RELATED APPLICATIONS

Reference is made to PCT/EP2020/083514 filed Nov. 26, 2020, designating the United States, and German Application No. 10 2019 218 775.5 filed Dec. 3, 2019, which are incorporated herein by reference in their entirety.

BACKGROUND OF THE INVENTION

Field of the Invention

The invention relates to a method for producing a moldable thermoplastic, continuous fiber-reinforced composite structure that has at least two layers having continuous fibers being embedded in a matrix of thermoplastic material in at least one of the layers. A moldable composite structure and a device for producing same are also described.

Description of the Prior Art

The production of lightweight components for high-volume applications involves the use of continuous, fiber-reinforced, synthetic thermoplastics, which are mostly designed in the form of compact multilayer structures and laminates or sandwich structures with at least one structured layer, for example, in the form of a honeycomb core structure or an unstructured layer, for example, as foam core. For the purpose of improved durability and increased protection from mechanical damage, multilayer structures of such kind often have at least one continuous, fiber-reinforced cover layer which is applied at least to one side, and preferably to both sides.

In order to produce lightweight components, the multilayer structures are provided mostly in the form of flat, planar semifinished composite structure products which have at least one continuous, fiber-reinforced cover layer, in which continuous fibers of synthetically manufactured fiber materials such as glass, carbon, aramid or of natural fiber raw materials such as cellulose, bast or the like are embedded in a matrix made from thermoplastic material. The fibers may be arranged geometrically, for example unidirectionally side by side or each having an intersecting orientation in the form of a woven fabric, or chaotically, or they may be embedded in the thermoplastic matrix in the form of a tangled ball, a woven, or in the manner of a cottonwool wad.

The flat, semifinished composite structure products are typically processed to create intricately shaped lightweight components during pressing or thermoforming processes, in which the flat, solid semifinished composite structure product is heated to a processing temperature-which is variable depending on the thermoplastic material-prior to a molding processing step. In this context, the thermoplastic material in which the continuous fibers are embedded is heated above its melting temperature, which causes it to melt. This is essential to ensure that the continuous fibers are able to slide past each other within the thermoplastic melting areas during molding, so that after molding under pressure applied by a molding tool the composite solidifies optimally into a solid composite again. During the molding process, the fibers are at least one of shifted and re-orientated, which leads to significant changes and effects on the mechanical properties of the finished components. The re-orientation and shifting of the fibers within the molten matrix of thermoplastic material during the molding process must therefore be taken into account before and during the design and implementation of the process in order to avoid structural weaknesses of the lightweight component in the finished state which may occur within the fiber arrangement due to wrinkling or striations.

Heating of the newly created semifinished composite structure products is usually carried out using infrared radiation directed at the at least one cover layer that is to be heated on the semifinished composite structure products. Exposure of the cover layer that is to be heated with IR radiation results in even and homogeneous heating of the entire volume of the cover layer to produce the best possible conditions for allowing the fibers to slide within the cover layer. Specific controls enable homogeneous heating with infrared radiation above the melting temperature of the thermoplastic matrix system with temperature deviations of just a few degrees Kelvin over the entire surface of the cover layer. See Dr. Mesut Cetin; Christian Herrmann; Stefan Schierl: Hochdynamisches und homogenes Aufheizen von Organoblechen, 16. ATZ-Fachtagung [Ultradynamic, homogeneous heating of organic sheets, 16th ATZ Conference], Hamburg 2018.

Apart from the heating process, the shaping process is also affected critically by the molding tool. Thus, for example, optimal placement geometries for forming the fiber arrangement may also be created within the lightweight component by only defining the component design during the molding process.

The option also exists to influence the molding process positively with the aid of at least one of "hold-down devices" and die elements integrated in the molding tool. In this context, reference is made to WO 2018/060195 A1, which discloses a method for producing a continuous fiber-reinforced shaped part, in which the molding tool used includes a hold-down device which is able to generate locally elevated static friction forces between the continuous fibers plastic matrix for the purpose of fixing and stabilizing the fibers. Particularly with deeply curved components, in this way it is primarily possible to prevent wrinkling in the fiber course in laminate regions that are exposed to strong pressure. Depending on the complexity of the component, it is also possible to select a semifinished composite structure product with the alignment and arrangement of the continuous fibers that matches the degree of reshaping required. In this context, fibers that are arranged side by side and aligned in the same direction have very low shaping capability, whereas fibers in the form of textile woven or knitted fabrics prevent tearing between the fibers during shaping, so that more intensive reshaping can be carried out.

Another method for influencing the position of continuous fibers embedded in a softened thermoplastic matrix during a molding pressing process fixes the fibers to each other locally using binder methods before they are embedded in the thermoplastic material matrix in order to stabilize the geometric fiber arrangement, to prevent the fibers from being re-orientated during the thermally assisted molding process. For example, known binder methods include for example joining the fibers using sewing techniques or substance-to-substance adhesive bonding. See for example Lina Girdauskaite: Lokale Strukturfixierung im Preformherstellungsprozess für komplex gekrümmte Faserkunststoffverbundbauteile (Local structure fixing in the preform production process for fiber plastic composite components with complex curvatures), Dresden 2011.

DE 10 2016 203 711 A1 discloses a method for producing a dimensionally stable hollow body from an organic sheet which for reshaping reasons is heated for purposes of cladding a carrier framework, so that the plastic deformation enables the organic sheet to cling closely to the contour of the circumference spanned by the carrier framework.

DE 10 2013 013 497 A1 describes a method for producing a component from at least two separate organic sheets which are positioned to overlap one another, and which are joined in a substance-to-substance bond using a welding procedure.

DD 94 886 A1 discloses a device for butt welding semifinished thermoplastic products with a prismatic reflector which directs an IR or laser beam passing through the reflector onto both sides of the frontal faces of two thermoplastic weld parts for joining arranged with the frontal faces opposite one another.

DE 10 2011 052 979 A1 describes a method and system for heating a surface of a component using IR radiation emitted by an IR point radiation source, the IR beams of which are reshaped into parallel IR beams by a parabolic mirror arrangement, and which are directed towards selected surface regions of the component.

DE 10 2014 006 681 A1 describes a method and device for joining flat bodies made from fiber bundle material, which are partly melted on a local joining region and into which a thermoplastic joining element in the form of a rivet is introduced.

SUMMARY OF THE INVENTION

Underlying the invention is creation of the prerequisites for producing thermoplastic, continuous fiber-reinforced composite structures, such that at least one of shifts and deformations of the fibers that are induced by reshaping and are detrimental to the subsequent stability of the composite structure in a molding process are prevented or at least reduced to a such a degree as to be negligible. To do this, a suitable method is described by which a moldable thermoplastic, continuous fiber-reinforced composite structure is obtained, which has at least two layers, of which at least one layer contains continuous fibers embedded in a matrix of thermoplastic material, and which can be transferred to a subsequent thermal molding process.

Also described is a moldable thermoplastic continuous fiber-reinforced composite structure associated therewith, which possesses the aforementioned properties. Further described as a device for producing a moldable, thermoplastic continuous fiber-reinforced composite structure of such kind.

The method according to the invention builds on the approach that is known per se of local bonding of fibers for the purpose of at least one stabilizing and maintaining the shape and position of the continuous fibers embedded within the matrix of thermoplastic material, in order to counteract an undesirable shift of the fibers during at least one of a shaping process or to favor deformations and position changes of the continuous fibers in order to obtain the most ideal mechanical properties of the final molded composite structure.

According to the invention, the method for producing a moldable thermoplastic continuous fiber-reinforced composite structure having the features of a semifinished composite structure product comprising the at least two layers, of which the least one layer in which the continuous fibers are contained is heated such that the matrix of thermoplastic material within at least one first surface region to or above a melting temperature of the thermoplastic material, and the matrix of thermoplastic material is kept to a temperature below the melting temperature within a second surface region directly adjoining the first surface region. The semifinished composite structure product heated is this way is provided as the moldable thermoplastic continuous fiber-reinforced composite structure in which the continuous fibers can be moved relative to each other within the first surface region and are spatially fixed relative to each other within the second surface region.

Similarly to the binder methods described previously, by which fibers are joined to each other locally in order to avoid undesirable re-orientations of the fibers in the course of a thermally assisted reshaping process, according to the invention the at least one second surface region, within which the matrix of thermoplastic material, in which the continuous fibers are embedded, is not melted and thus remains solid, functions as a stabilizing support region for the positioning pattern of the continuous fibers, in which the continuous fibers retain their fixed spatial position relative to each other even during a thermoforming process. The at least one second surface region thus represents a fixed matrix region after thermal treatment according to the invention, ensuring a matrix-based connection between the individual continuous fibers and corresponding to a joining region, which can be created otherwise using sewing techniques of adhesive bonds which are known per se.

Compared with known binder methods, the method according to the invention is characterized in particular in that the continuous fibers embedded within the thermoplastic matrix do nor require a work-intensive and expensive pretreatment such as sewing or adhesion. The number, position and shape of the respective second surface regions of the layer containing the continuous fibers, which correspond to the fixed joining points or regions, are predetermined solely by a specific procedure during heating of the semifinished composite structure product.

In an alternative method variant according to the invention, in which a semifinished composite structure product is also provided with the at least two layers, the at least one layer in which the continuous fibers are contained is heated in such manner that the matrix of thermoplastic material within at least one first surface region is heated to a first temperature T1 above a melting temperature assigned to the thermoplastic material, and the matrix of thermoplastic material within a second surface region directly adjoining the first surface region is heated to a second temperature T2, which is at least equal to the melting temperature and is lower than the first temperature T1. The semifinished composite structure product heated in this way is provided as the moldable thermoplastic, continuous fiber-reinforced composite structure of which the continuous fibers within the first surface region are able to move relative to each other more readily than the continuous fibers within the second surface region.

Through the targeted setting and selection of the two temperatures T1 and T2, each above the melting point of the thermoplastic material, of which T2 is selected to be smaller or lower than T1, it is possible to preset differing viscosities in the at least two directly adjacent first and second surface regions. The viscosities are decisive with regard to the ability of the continuous fiber components contained in both surface regions to move relative to each other in the two surface regions in the molten thermoplastic matrix in each case. Because of the higher temperature T1 prevailing in the first surface region, the viscosity $\eta 1$ of the molten thermoplastic material in this surface region is lower than the viscosity η2 of the molten thermoplastic material in the second surface region at temperature T2. This means that the ability of the continuous fibers to move relative to each other is greater within the first surface region than the ability of the continuous fibers to move relative to each other in the second surface region.

Depending on the nature of the downstream processes, particularly shaping processes, which the moldable, thermoplastic, continuous fiber-reinforced composite structure according to the solution undergoes afterwards, the relative movement capabilities of the continuous fibers in the at least two adjoining surface regions may be adjusted to the requirements of specific processes by varying the thermal input.

Advantageously, the ideal semifinished composite structure product is a flat, compact, solid multilayer structure that has two, and preferably more fixed layers, each made from full material, of which at least one cover layer of each multilayer structure is manufactured from thermoplastic material, in which the continuous fibers are embedded. Multilayer structures of such kind are also called organic sheets. Also suitable as semifinished composite structure products are flat, solid sandwich structures, with at least one core layer that is at least partly filled with air or gas, for example in the form of a honeycomb-structured layer structure or an unstructured foam layer, at least one side of which directly or indirectly adjoins a cover layer in which the continuous fibers are embedded in the matrix of thermoplastic material.

According to a non-essential but preferred embodiment, all layers of the semifinished composite structure product are made from thermoplastic materials which have each been selected consistently or have identical or similar melting temperatures.

Regardless of the number of individual layers in the flat semifinished composite structure product as provided, the heating according to the invention is directed mainly at the outermost layer in each case, that is each of the one or more cover layers of the semifinished composite structure product in which the continuous fibers are embedded.

The purpose of heating precisely the cover layer is preferably served by a homogeneous infrared radiation field which may be generated by at least one radiation source, and which is directed towards the at least one cover layer. In this way, the cover layer is heated contactlessly by use of a continuous infrared radiation field.

In a first method variant, the infrared radiation field is directed in locally limited manner exclusively towards the first surface region or the respective first surface regions, in which it is intended to heat the matrix of thermoplastic material in the cover layer above the melting temperature thereof as homogeneously and completely as possible. At the same time, however, it is important to ensure that at least one of the second surface region directly adjoining the first surface region or the respective second surface regions directly adjoining the first surface regions are not exposed, or only exposed to a negligible degree, to the infrared radiation field, so that the thermoplastic material in each of these second surface regions remains below the melting temperature thereof and such remains in a solid aggregate state, with the result that each of the continuous fibers or continuous fiber regions extending within the respective second surface region remain joined in spatially fixed manner or attached to each other even after the heating process.

With the application of the alternative method variant according to the invention, the thermoplastic material matrix in the second surface region is heated above the melting temperature to temperature T2, which is however lower than the temperature T1 prevailing in the first surface region. In this way, the continuous fiber components in the second surface region remain movable relative to each other, but to a degree which is adjustable in controlled manner and less than the continuous fiber components within the first surface region. Thus, it is possible to create thermal conditions that are individually harmonized with each other within two adjoining surface regions, with viscosities that are each adjustable in controlled manner and associated relative movement capabilities of the continuous fiber components within the respective molten thermoplastic material matrix.

In order to shade or cover the respective second surface region of the cover layer, screens or masks can be used which are arranged as close as possible to the surface of the cover layer and thus confer a thermal shading effect to protect the respective second surface region or the respective second surface regions from the infrared radiation field which would otherwise act on the cover layer.

In a further preferred embodiment of the method according to the invention, in a first method step the entire surface of the at least one cover layer containing the continuous fibers of the semifinished composite structure product is heated homogeneously to a preheat temperature below the melting temperature of the thermoplastic material. In principle, the preheating may be carried out by any means, for example in at least one of a furnace and using at least one radiation source to generate an infrared radiation field directed towards the surface of the cover layer of the semifinished composite structure product.

In a second, subsequent method step, only the at least one first surface region of the cover layer of the semifinished composite structure product is heated to or above the melting temperature, with the result being that the matrix of thermoplastic material present in this at least one first surface region is converted to a flowable or fluid aggregate state.

The heating of the cover layer of the semifinished composite structure product in the second method step is performed with at least one infrared radiation field in such manner that an element is introduced between an infrared radiation source emitting the at least one infrared radiation field and at least one second surface region of the cover layer, by which the at least one second surface region is shielded from the infrared radiation field. As was noted earlier, a preferred element suitable for performing this function is a screen or mask arrangement which at least one of absorbs and reflects the infrared radiation that impinges on it and thereby prevents the thermoplastic material within the respective second surface region from melting.

In a preferred variant of the method, a forced air or gas flow is generated in the heating chamber and at least intermittently is passed along the at least one cover layer to be heated before, during and after heating of the at least one cover layer of the semifinished composite structure product, to avoid heat accumulation effects between the screen or mask arrangement and the surface of the cover layer, and thus also strengthen the selectivity between each first surface region to be softened thermally and the respective second surface region immediately adjacent thereto, in which the matrix of thermoplastic material remains in a solid aggregate state.

The number, shape and size of each of the first and second surface regions immediately adjoining each other is determined in each case by the design of the screen or mask arrangement which is discussed in greater detail later, with reference to an illustrated exemplary embodiment thereof.

The heating of the semifinished composite structure product is preferably ended as soon as the matrix of thermoplastic materials within the respective first surface region has melted uniformly at a predefined temperature.

The moldable thermoplastic continuous fiber-reinforced composite structure which has been thermally treated in this way is thus characterized according to the invention with the matrix of thermoplastic material being melted within at least the one first surface region, with the result that the continuous fibers within the first surface region are able to move relative to each other, whereas the matrix of thermoplastic material within a second surface region immediately adjoining the first surface region retains its solid consistency, and the continuous fibers within the second surface region accordingly remain spatially fixed relative to each other.

In an advanced variant of the method according to the invention, the second heating step, in which the thermoplastic material within the at least first surface region has been melted homogeneously, is followed by a further heating step, whereby an area-specific temperature gradient is produced within each first surface region, that is at least one subsection of the region with a higher temperature than the prevailing temperature exists within a first surface region. By producing such an area-specific temperature gradient it is possible to obtain technically usable thermal effects in the layers of thermoplastic material of the composite structure which are each at least one of directly and indirectly adjacent to the cover layer. For example, if the layer concerned is a structured core layer in the form of a honeycomb structure for example, positioned below the cover layer, it is thus possible to control the temperature of the honeycomb structure made of thermoplastic material locally and individually, and consequently to reshape areas thereof differently.

The concept on which the method according to the invention is based, is that of local fixing or establishing a predetermined, preferably reduced relative movability in controlled manner of the continuous fibers embedded within a matrix of thermoplastic material inside a cover layer of a composite structure and creating softened surface regions of the cover layer for a controlled relative movement of the continuous fibers in the softened matrix as part of a subsequent thermopressing or thermoforming process, which enables the thermal pretreatment of a moldable thermoplastic continuous fiber-reinforced composite structure to be carried out inexpensively and in a manner that lends to industrial manufacturing, with the result of the structure being then suitable as a semifinished product for a subsequent processing operation in which the composite structure is at least one of functionalized and molded.

Moreover, the suitability for a subsequent pressing or thermoforming process as described previously is that the cover layer regions that have been melted according to the invention are suitable for attaching further thermoplastic parts or components, which may be joined to the first surface regions, each of which have been softened above their melting point, in an injection molding or casting process.

BRIEF DESCRIPTION OF THE DRAWINGS

The invention will now be described for exemplary purposes without limitation of the general inventive thought on the basis of embodiments thereof and with reference to the drawing. In the drawing:

FIG. 1 is a schematic representation of a semifinished composite structure product;

FIGS. 2a. b and c show the sequence of process steps for heating and softening the semifinished composite structure product according to the invention; and FIG. 3 is a representation of a preferred variant of a moldable, thermoplastic continuous fiber-reinforced composite structure.

DETAILED DESCRIPTION OF THE INVENTION

FIG. 1 shows a schematic longitudinal cross-section through a flat semifinished composite structure product 1, which is constructed as a multilayer structure having three layers, with a top cover layer 2 being made from a thermoplastic material in which continuous fibers 3 are embedded. A core layer 4 is located immediately adjacent to the top cover layer 3, and is constructed either from further continuous fiber-reinforced thermoplastic individual layers or a structured thermoplastic layer, in the form of a honeycomb structure for example. A bottom thermoplastic cover layer 5 is located immediately below the core layer 4. Continuous fibers 3 are also embedded in the thermoplastic matrix of the bottom cover layer. The thermoplastic materials of at least the top and bottom cover layers 2, 5 are preferably identical. The flat semifinished composite structure product initially has a solid consistency.

In order to heat the respective top and bottom cover layers 2, 5, the semifinished composite structure product 1 illustrated in FIG. 1 is positioned between two infrared radiation fields 6, which are each emitted by a plurality of radiation sources 7 mounted on support structures 8, as shown in FIG. 2a. Both infrared radiation fields 6 have a homogeneous radiation intensity, with which the semifinished composite structure product 1, mounted on a support grid structure 13, is irradiated uniformly. The support grid structure 13 preferably is a metal grating which is transparent to infrared radiation but has no or negligibly weak infrared shading properties.

The surfaces of the top and bottom cover layers 2, 5 of the semifinished composite structure product 1 are irradiated completely and uniformly in a preheating process until both cover layers 2, 5 reach a temperature just below the melting point of the thermoplastic material. The melting temperature is defined as the crystallite melting point for semicrystalline thermoplastics and as the glass transition temperature for amorphous thermoplastics.

After reaching a predetermined target temperature just below the melting temperature, typically 3 to 20 K below the melting temperature, screens 9, preferably made from a metallic material, are placed close to the surface of the cover layers 2, 5 between the IR radiation sources 7 and the semifinished composite structure product 1. Preferably each are at a distance between 0.5 and 3 cm above or below the surface of the cover layer. The screens shield the top and bottom cover layers 2, 5 from infrared radiation 6 for the purpose of further heating of the respective second surface region 10, with the result being that further heat input by the infrared radiation 6 in these respective second surface regions is prevented. The screens 9 are preferably arranged to be movable relative to the support grid structure 13, so the screens 9 are each slidable above or below the top or bottom cover layer 2, 5 respectively for purposes of shielding them from infrared radiation.

In the subsequent phase of the process, the regions that are not shielded by the screens 9, referred to as the first surface regions 11, are heated further until the thermoplastic material within the first surface regions 11 of the top and bottom cover layers 2, 5 is completely and uniformly molten.

Since the coefficient of thermal conductivity of the thermoplastic material in the top and bottom cover layers 2, 5 is only small, and due to the colder air temperature in the atmosphere surrounding the semifinished composite structure product 1—compared with the temperature of the semifinished composite structure product—little or only a negligible quantity of heat is input into the respective shielded second surface regions 10. This enables a highly effective isolation of the respective solid thermoplastic matrix within the second surface regions 10 from the respective, molten first surface regions 11 which are directly adjacent thereto. The melting process according to the invention can be interrupted or ended instantaneously as shown in FIG. 2c to prevent undesirable overheating and the associated material degradations within the softened thermoplastic material matrix.

The shape, number and size of each of the second surface regions 10, that remain in the solid aggregate state, may be selected individually using individually configured and arranged screens 9.

As the outcome, a moldable thermoplastic continuous fiber-reinforced composite structure 12, as illustrated in FIG. 3, is obtained, whose top and bottom cover layers 2, 5 have first surface regions 11, in which the continuous fibers 3 embedded in the locally melted thermoplastic matrix are movable relative to each other, whereas within the second surface regions 10 immediately adjoining the first surface regions 11 the continuous fibers 3 embedded in the respective solid thermoplastic matrix are joined fixedly. The fixed attachment of the continuous fibers within the second surface region 10 is ensures that the continuous fibers 3 within the first surface regions 11 can be re-orientated correctly in the course of subsequent reshaping process. The stabilization of the continuous fibers with each of the second surface regions 10 makes it possible to obtain more complex component geometries when producing continuous fiber-reinforced thermoplastic components with reversibly definable material properties.

The moldable, thermoplastic, continuous fiber-reinforced composite structure 12 can be removed from the infrared heater with the aid of a suitable gripping and transporting apparatus, which grips and handles the composite structure 12 only by the unmelted second surface regions 10, and these leave no handling marks of any kind on the surfaces of the respective second surface regions 10.

The screens 9 explained previously lend themselves to use in the case of the alternative method variants, in which the second surface regions 10 are also heated to a temperature T2 above the melting temperature but below the temperature T1 prevailing in the respective first surface regions 11. Contrary to the previous explanations, both cover layers 2, 5 are preheated completely and uniformly to temperature T1, preferably just above the melting point of the thermoplastic material. The further heating is carried out as described earlier, using screens 9 that shield the respective second surface regions 10 contactlessly.

LIST OF REFERENCE NUMERALS

1 Semifinished composite structure product
2 Top cover layer
3 Continuous fibers
4 Core layer
5 Bottom cover layer
6 Infrared radiation field
7 Infrared radiation source
8 Support structure
9 Screen
10 Second surface region
11 First surface region
12 Composite structure
13 Support grid structure

The invention claimed is:

1. A method of producing a moldable thermoplastic, continuous fiber-reinforced composite structure including at least two layers having continuous fibers embedded in a matrix of thermoplastic material in at least one layer thereof, comprising:
   contactlessly heating at least one of the at least two layers with an infrared field irradiating at least one first surface region of at least one of the two layers to cause the at least one irradiated first surface region to be heated to or above a melting temperature of the thermoplastic material;
   producing a semifinished complete product by maintaining the temperature of the matrix of thermoplastic material at or below the melting temperature of the thermoplastic material in at least one second surface region which directly adjoins the at least one first surface region during the contactless heating of the at least one first region by introducing a shading element between a source of the infrared radiation and the at least one second surface region which shields the at least one second surface region from direct irradiation by the infrared field; and
   moving the semifinished composite product, after being heated with the infrared field, to cause the continuous fibers to be moved relative to each other within the at least one first surface region and spatially fixed relative to each other within the at least one second surface region.

2. A method for producing a moldable thermoplastic fiber-reinforced composite structure having at least two layers having continuous fibers embedded in a matrix of thermoplastic material in at least one layer thereof, comprising:
   contactlessly heating the at least one layer including the continuous fibers, with an infrared radiation field, to cause the matrix of thermoplastic material within at least a first surface region to be heated to a first temperature above a melting temperature of the thermoplastic material by the infrared radiation field directly irradiating the area of only the at least one first surface region and heating the matrix of thermoplastic material within a second surface region, which directly adjoins the first surface region, to a second temperature which is at least equal to the melting temperature of the thermoplastic matrix and is lower than the first temperature, by introducing an element between an infrared radiation source of the infrared field and the at least one second surface region to shield the at least one second surface region from direct irradiation of the field of infrared radiation; and wherein
   the moldable thermoplastic, continuous fiber-reinforced composite structure, which is heated to the first and second temperatures, has the continuous fibers within the first region more readily movable than the continuous fibers within the second surface region.

3. The method according to claim 1, comprising:
   a flat solid multilayer structure or a flat solid sandwich structure is contained with at least one core layer structure which is at least partly filled with air or gas, and with at least one cover layer which contains the continuous fibers embedded in a matrix of the moldable thermoplastic material.

4. The method according to claim 2, comprising:
a flat solid multilayer structure or a flat solid sandwich structure is contained with at least one core layer structure which is at least partly filled with air or gas, and with at least one cover layer which contains the continuous fibers embedded in the matrix of the moldable thermoplastic material.

5. The method according to claim 1, comprising:
heating of the composite structure product with at least one infrared radiation field so that the infrared radiation field is directed homogeneously towards at least one layer in which the continuous fibers are embedded in the matrix of thermoplastic material.

6. The method according to claim 2, comprising:
heating the composite structure with at least one infrared radiation field so that an infrared radiation field is directed towards the at least one layer in which the continuous fibers are embedded in the matrix of thermoplastic material.

7. The method according to claim 3, comprising:
heating at least a layer of the thermoplastic composite structure which uniformly contains the continuous fibers to a preheat temperature below the melting temperature of the moldable thermoplastic, and heating only the at least one first surface region of the fiber reinforced composite structure product above the melting temperature.

8. The method according to claim 2, comprising:
heating at least a layer of the thermoplastic composite structure which uniformly contains the continuous fibers to the second temperature and heating only the at least first surface region of the fiber reinforced composite structure to the first temperature.

9. The method according to claim 8, comprising:
using a screen or mask which at least one of absorbs or reflects the infrared radiation.

10. The method according to claim 7, comprising:
at least intermittently generating a forced air flow between at least one infrared radiation source and the fiber reinforced composite structure for at least one of before, during, and after heating of the fiber reinforced composite structure.

11. The method according to claim 1, comprising:
stopping heating of the fiber reinforced composite structure product as soon as the matrix of thermoplastic material within the first surface region is melted uniformly at a first temperature.

12. The method according to claim 2, wherein:
stopping heating of the moldable thermoplastic, continuous fiber reinforced which is a semifinished composite structure as soon as the matrix of thermoplastic material within the first surface region is melted uniformly at the first temperature.

* * * * *